United States Patent
Tien et al.

(10) Patent No.: US 7,984,115 B2
(45) Date of Patent: Jul. 19, 2011

(54) EXTENSIBLE APPLICATION PLATFORM

(75) Inventors: Ian Robert James Tien, Seattle, WA (US); Corey Hulen, Sammamish, WA (US); Chen-I Lim, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1257 days.

(21) Appl. No.: 11/636,645

(22) Filed: Dec. 8, 2006

(65) Prior Publication Data
US 2008/0140671 A1 Jun. 12, 2008

(51) Int. Cl.
*G06F 15/16* (2006.01)
(52) U.S. Cl. .................. 709/219; 709/203; 709/224
(58) Field of Classification Search .......... 709/217–219, 709/203, 223–224
See application file for complete search history.

(56) References Cited

U.S. PATENT DOCUMENTS

| | | | |
|---|---|---|---|
| 6,381,743 | B1 | 4/2002 | Mutschler, III |
| 6,701,383 | B1 * | 3/2004 | Wallace et al. ............... 719/328 |
| 6,751,648 | B2 * | 6/2004 | Kakimoto et al. ............ 709/219 |
| 6,995,768 | B2 | 2/2006 | Jou et al. |
| 7,117,215 | B1 | 10/2006 | Kanchwalla et al. |
| 7,120,896 | B2 | 10/2006 | Budhiraja et al. |
| 2005/0198618 | A1 | 9/2005 | Lalonde et al. |
| 2005/0262512 | A1 | 11/2005 | Schmidt et al. |
| 2006/0036455 | A1 | 2/2006 | Prasad et al. |
| 2006/0041665 | A1 | 2/2006 | Neeran et al. |
| 2006/0112123 | A1 * | 5/2006 | Clark et al. .................. 707/101 |
| 2008/0052314 | A1 * | 2/2008 | Batabyal .................... 707/104.1 |

OTHER PUBLICATIONS

Funkhouser, Thomas A., "Ring: A Client-Server System for Multi-User Virtual Environments," *Symposium on Interactive 3D Graphics*, pp. 85-92 and 209, (1995).
Dan et al., "Business-to-business integration with tpaML and a business-to-business protocol framework," *IBM System Journal*, vol. 40, No. 1, pp. 68-90 (2001).
Lewandowski, Scott M., "Frameworks for Component-Based Client/Server Computing," *Dept. of Computer Sci., Brown Univ.*, pp. 1-39, (1998).
Ensel, et al., "Managing Application Service Dependencies with XML and the Resource Description Framework," *Munich Network Management Team, Univ. of Munich*, pp. 1-14, (2001).
Noyes, Brian, "Deploy and Update Your Smart Client Projects Using a Central Server," *MSDN Magazine*, May 2004, pp. 1-10.
Sheffield, Kim, "Project RDL-Open Source Report Definition Language Implementation in C#," Jan. 1995, pp. 1-12, printed at http://www.codeproject.com/csharp/RdlProject.asp on Nov. 30, 2006.
Screenshot of Optimizer Solver printed at http://linux.softpedia.com/screenshots/Optimization-Solver-for-OpenOffice-org-Calc_1.png on Nov. 30, 2006.
Screenshot of Openoffice.org printed at http://www.flexbeta.net/images/openoffice/chart.gif on Nov. 30, 2006.

(Continued)

*Primary Examiner* — Philip B Tran
(74) *Attorney, Agent, or Firm* — Wolf, Greenfield & Sacks, P.C.

(57) ABSTRACT

An extensible client-server application platform. Execution of functions may require interactions between client-side and server-side components. Extensions may be provided as pairs of modules, one for the client and one for the server, that interact when performing an extension function. To ensure that the client-side and server-side interact appropriately, extensions modules may be initially supplied to the server and downloaded as appropriate, to the client. An enterprise business intelligence application is used as an example of the extensible client-server application platform. To enable use of third party extension modules, the server-side components may execute on a virtualized server.

12 Claims, 9 Drawing Sheets

OTHER PUBLICATIONS

Pentaho Open Source Business Intelligence screenshot, pp. 1-2 printed at http://www.pentaho.orq/index.php?option=com_content&task=view&id=36&Itemid=80 on Nov. 30, 2006.

Business Objects screenshot printed at http://www.businessobjects.com/ on Nov. 30, 2006.

Hyperion Business Performance Software screenshot, 1998-2006 printed at http://www.hyperion.com/ on Nov. 30, 2006.

Cognos Business Intelligence Software screenshot, 2006, pp. 1-2, printed at http://www.cognos.com/ on Nov. 30, 2006.

CRM Company Information screenshot, 2000-2006, pp. 1-2, printed at http://www.salesforce.com/company/ on Nov. 30, 2006.

* cited by examiner

FIG. 2B

230 — YEAR = 1997

| | PRODUCT 1 | PRODUCT 2 | PRODUCT 3 | PRODUCT 4 |
|---|---|---|---|---|
| CUSTOMER 1 | 9,800 | 5,000 | 0 | 0 |
| CUSTOMER 2 | 0 | 250,000 | 0 | 0 |
| CUSTOMER 3 | 0 | 10,000 | 0 | 326,000 |
| CUSTOMER 4 | 52,000 | 27,000 | 0 | 0 |
| CUSTOMER 5 | 57,000 | 32,000 | 0 | 62,000 |
| CUSTOMER 6 | 0 | 0 | 5,000 | 0 |

250 — YEAR = 1998

| | PRODUCT 1 | PRODUCT 2 | PRODUCT 3 | PRODUCT 4 |
|---|---|---|---|---|
| CUSTOMER 1 | 9,800 | 5,000 | 0 | 0 |
| CUSTOMER 2 | 10,000 | 0 | 0 | 0 |
| CUSTOMER 3 | 0 | 12,000 | 5,000 | 310,000 |
| CUSTOMER 4 | 62,000 | 25,000 | 0 | 0 |
| CUSTOMER 5 | 55,000 | 35,000 | 0 | 158,000 |
| CUSTOMER 6 | 0 | 0 | 350,000 | 0 |

$256_{2,2}$, $256_{6,3}$

EXTENSIBLE APPLICATION PLATFORM

BACKGROUND

Data processing systems are widely used throughout business enterprises. However, developing, deploying and maintaining these systems to efficiently extract useful information poses many challenges. Often, extracting useful information involves interaction with multiple data processing systems.

Business intelligence applications, which may run on servers within the enterprise, can aid in extracting useful information by automating access to multiple data sources and processing of data obtained from those sources. However, developing a business intelligence application involves a combination of knowledge and skills that is difficult to assemble. Knowledge of information technology (IT) infrastructure within the enterprise, particularly available data sources and how to access them, must be combined with business insight into how data in multiple data sources can be filtered or combined to produce a useful result.

Frequently, people with the skills and knowledge needed to develop an effective business intelligence application are unavailable within an enterprise or are so sought-after that they do not have the time to devote to developing a business intelligence application. Acquiring from outside the enterprise the resources to develop a business intelligence application can be expensive.

SUMMARY OF INVENTION

A framework is provided in which an application, such as a business intelligence application, can be readily developed, deployed and maintained. The framework may include a client component and a server component, both of which may be extensible.

Multiple techniques may be used, alone or in combination, to facilitate extensibility of the application. One technique entails providing extensions in pairs of modules, one for the client and one for the server, for functions that require interactions between a client and a server. When interacting modules are used, another technique entails first distributing the modules to the server. When an extension function is requested from a client, the server may provide any modules not available on the client used in executing that function.

A further technique entails the use of virtualized server for execution of extension modules. Virtualization reduces the risk that an extension module will perform maliciously and consume server resources to the extent that operation of other server functions is disrupted. Virtualization may enable the extensible application, including third party supplied extensions, to be deployed within an enterprise without violating that enterprise's security policies that restrict execution of software provided by third parties on enterprise servers.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIGS. 2B and 2C are sketches of views of data take from a data source storing data on customer purchases in an illustrative business intelligence application;

DETAILED DESCRIPTION

The inventors have appreciated that many applications, such as business intelligence applications, could be improved if they were readily extensible. However, deploying extensible applications within an enterprise, particularly those like business intelligence applications that require interaction between client-side and server-side components, must overcome certain obstacles.

One obstacle is that maintaining all clients within the organization configured to appropriately interact with a server can be difficult, particularly if the server software can be updated or modified frequently. Another obstacle is that enterprise security policies frequently preclude installation of third party software, unless from a trusted source, on enterprise servers. However, a benefit of extensibility is that extensions may be obtained from a myriad of sources, including many that will not likely comply with enterprise security policies.

Multiple techniques may be used, alone or in combination, to overcome these obstacles. One technique is to provide computer-readable modules that implement extensions in pairs of interacting modules, with one module for a server and one for clients that interact with the server. The modules may be initially deployed on the server and the client module may be downloaded to the client whenever needed, ensuring that the client is configured with extension modules compatible with those on the server. A mechanism may be provided to determine whether the client needs a copy of a client-side module whenever an extension function requiring the client to have access to the module is executed.

Further, to ensure compliance with an enterprise security policy, server-side extension modules may be executed within a virtual server. The resources available for use by the virtual server may be limited so that even if an extension module consumes excessive server resources, the effect is constrained to a single virtual server. Other applications executing on the server may thereby not be affected. Virtualization may be used even though the extension modules are executed within a framework that provides code access security.

These techniques may be applied in any of a number of applications. In the description that follows, a business intelligence application is used as an example of an application. A business intelligence application is likely to benefit from these techniques because such applications are frequently executed within enterprises that have security policies that would be violated by executing server-side extension modules. Further, such applications perform functions that require client-server interactions. Moreover, business issues for which business intelligence may be required are unpredictable, such that extensions may be frequently added or updated.

Figure 1:
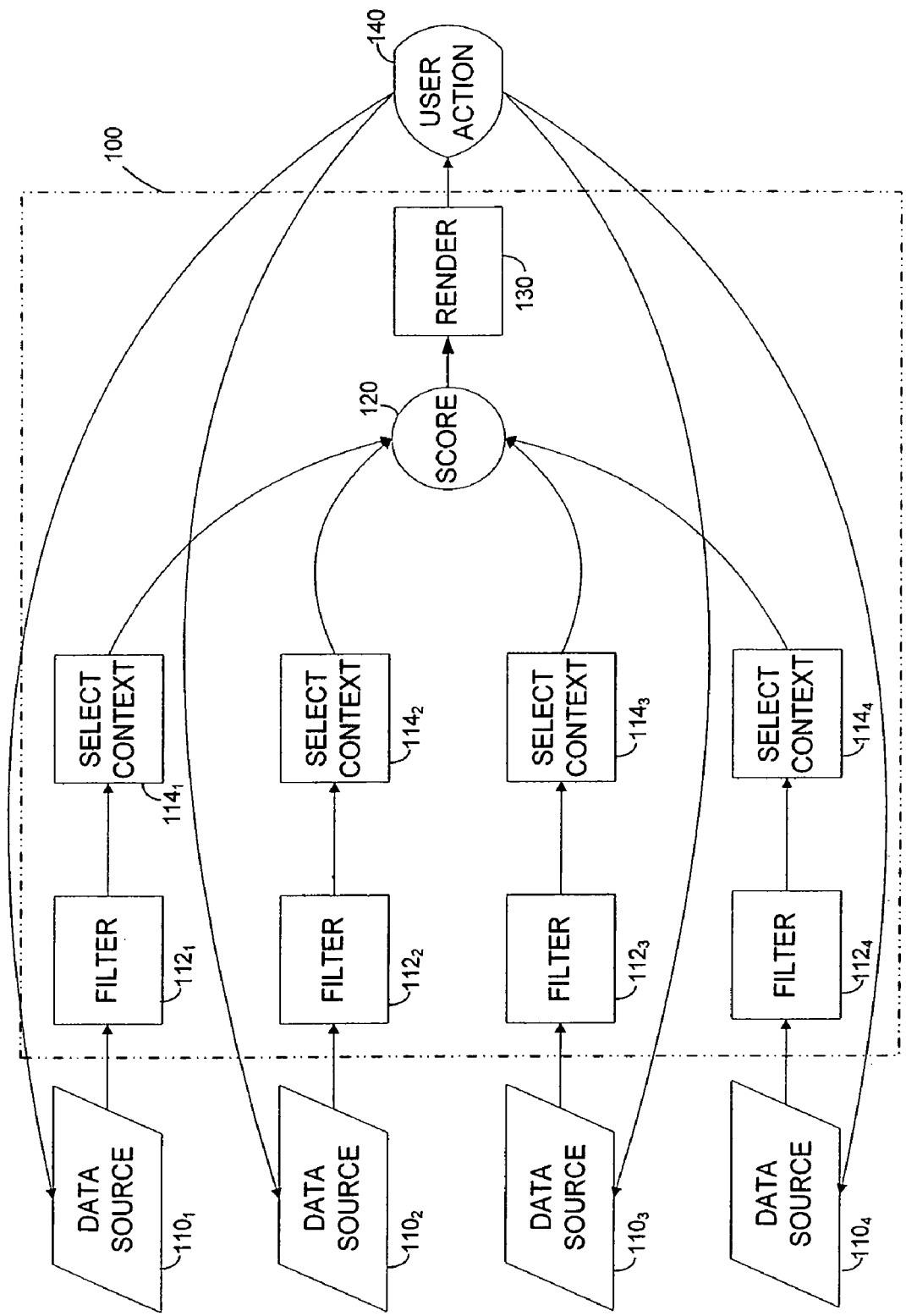
FIG. 1 is a functional block diagram of a business intelligence application.

FIG. 1 shows in block diagram form a business intelligence application 100. Business intelligence application 100 interacts with multiple data sources, here shown as data sources $110_1 \ldots 110_4$. Each data source stores business data about an enterprise in which business intelligence application 100 is deployed. In an enterprise, business data may be maintained in many types of business systems, each representing a data source. For example, an enterprise may maintain separate IT systems storing data about materials purchased to manufacture products, customers, customer purchases and financial results. Each such IT system may be a data source. In the example of FIG. 1, four data sources are shown. However, business intelligence application 100 may interact with any number of data sources.

Business intelligence application 100 may be programmed to extract data from data sourcing $110_1 \ldots 110_4$ and organize it in a fashion that it presents a user with information relevant to a business situation that a user is attempting to understand. In the embodiment illustrated in FIG. 1, information is extract from each data source using a filter, such as filters $112_1, \ldots 112_4$. From this filtered information, data having a context relevant to the specific scenario under investigation is selected by a context selection component, such components as $114_1 \ldots 114_4$.

Information with a selected context from each of the data sources is formatted to produce information presented to a user. In this example, the selected data is combined in scoring component 120. Scoring within component 120 may be performed according to a "scorecard," defining computations that may be performed to indicate metrics useful in understanding a business situation.

The results of the scoring are processed in rendering component 130. In this example, rendering component 130 formats the scored results in a fashion that is useful for displaying to a user. Rendering component 130 may format the values computed by scoring component 120 and/or data selected by components $114_1 \ldots 114_4$. For example, extracted data may be presented as graphs, charts or any other suitable reporting format.

Regardless of how the information is presented to a user, user interface component 140 may present the information to a human user and receive input from the user in response. The input provided by the human user may specify different or additional functions to be performed by business intelligence application 100 that charge either the data selected, the processing on that data or the manner in which it is displayed. In some embodiments, user input may also specify changes to the data stored in any of the data sources.

The specific filtering, context selection, scoring and rendering operations depend on the specific business scenario that a user is investigating. For this reason, business intelligence applications are programmed to generate information in multiple scenarios. Though some business intelligence applications come with preprogrammed report templates that may be used to display information for a user, business scenarios will frequently arise in which the preprogrammed reports are not applicable.

Accordingly, applicants have appreciated that providing a framework for a business intelligence application that can be readily extended as new business scenarios arise may greatly improve the usefulness of a business intelligence application.

Figure 2A:
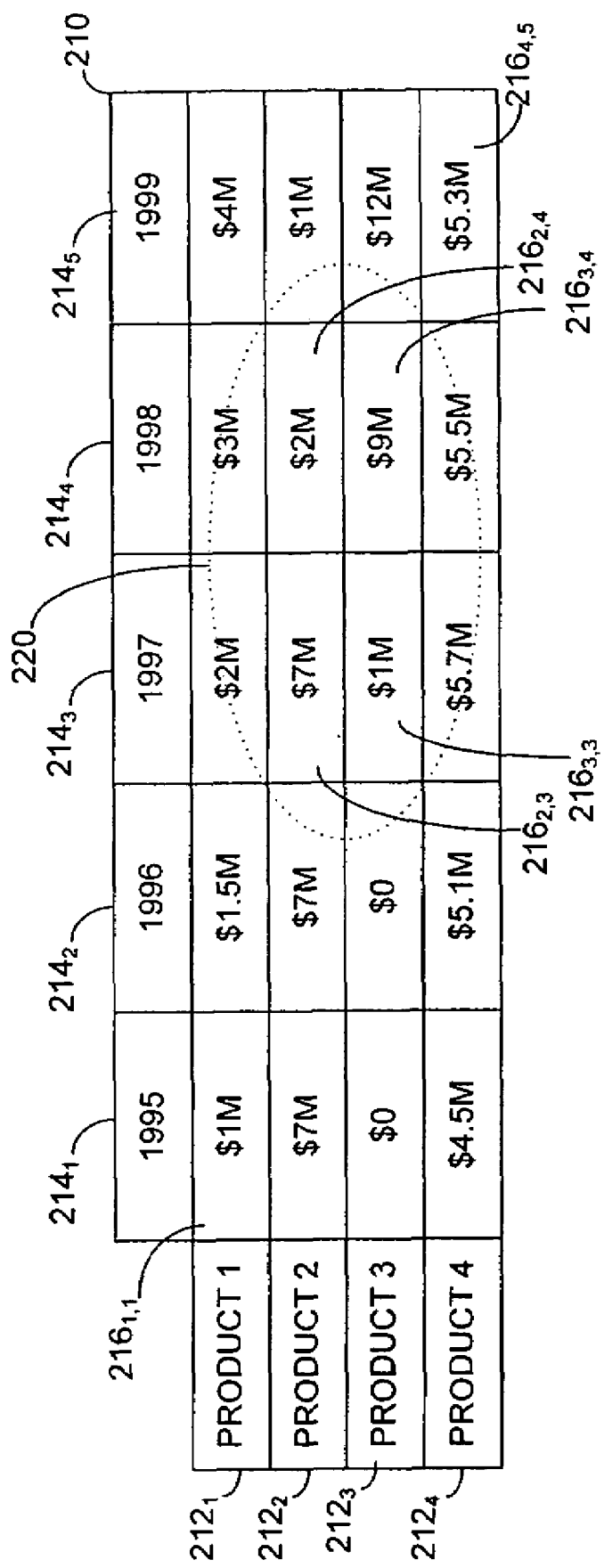
FIG. 2A is a representation of a view of data selected from a data source storing data on product sales in an illustrative business intelligence application.

FIGS. 2A, 2B, and 2C illustrate processing of data that may occur in a business intelligence application. FIG. 2A shows a "view" of data that may be selected from a data source. In the example of FIG. 2A the data relates to product sales by year. Accordingly, the data pictured in FIG. 2A may be selected from a data source that maintains sales data by product. That data source may contain much more data than is in the view of FIG. 2A. The specific data shown may have been selected in a filtering operation that selects data over a range of years, here shown to be 1995, 1996, 1997, 1998 and 1999. Also, filtering may have selected data relating to four products, here shown as PRODUCT1, PRODUCT2, PRODUCT3 and PRODUCT4.

The data may be stored in a computer readable form and need not have any specific physical form so long as a mechanism is provided to relate specific data values to specific produces and years. However, for simplicity of illustration, the data is depicted in a table 210. Each row of table 210, such as rows $212_1, \ldots 212_4$ provides sales data for a product in each of the five years selected. Each column of the table, such as columns $214_1, \ldots 214_5$ provides data on sales of each of the selected products in one of the years. The intersection of each row and each column creates a cell containing a data value. In the example of FIG. 2A, cells $216_{4,1} \ldots 216_{1,5}$ are shown with only a portion of the cells being numbered for clarity.

The data depicted in FIG. 2A may be regarded to define multiple data objects that may be manipulated by a business intelligence application. For example, a business intelligence application may manipulate the table 210 or may manipulate any one or more of rows $212_1 \ldots 212_4$, any one or more of columns $214_1, \ldots 214_5$ or any one or more of the cells $216_{1,1} \ldots 216_{4,5}$.

The position in which the selected object appears in table 210 defines its context. For example, cell $216_{1,1}$, in context, provides data on sales of PRODUCT1 in year 1995. As an another example, row $212_1$ provides sales data for PRODUCT1 between 1995 and 1999. Accordingly, data may be selected for analysis by creating views of the data and specifying a context.

In the example of FIG. 1, filter 112 selects the data from a data source to create table 210. Context selection component 114 selects the specific objects within table 210 for further processing. As an example of the complexity that can arise in a business intelligence application, FIG. 2A shows a group of cells 220 that indicates a precipitous drop in sales of PRODUCT2 between years 1997 and 1998. The data shows a corresponding precipitous increase in sales of PRODUCT3 between the same years. These precipitous changes sales may create a business scenario that a business analyst may wish to investigate. An analyst observing table 210 could conclude that the data in the cells in group 220 reveals that sales of PRODUCT3 cannibalized sales of PRODUCT2. However, by analyzing data from other sources, the analyst may reach a different conclusion.

FIGS. 2B and 2C illustrate data obtained from another data source that provides further insight into the precipitous change in sales depicted FIG. 2A. In this example, the data depicted in FIGS. 2B and 2C is obtained from a data source that maintains data on customer purchase of specific products. Table 230 (FIG. 2B) is made by creating a view from that data source for the year 1997 for CUSTOMER1 . . . CUSTOMER6 and PRODUCT1 . . . PRODUCT4. Table 250 (FIG. 2C) shows a view of data from the same data source filtered for the year 1998 for the same customers and products. By comparing data table 230 to data table 250, a business analyst may have further insight into the reason for the precipitous drop in sales depicted in FIG. 2A. In this example, data table 230 shows that sales of PRODUCT2 in year 1997 were predominately made to CUSTOMER2. These sales are represented by the value in cell $236_{2,2}$. In 1998, sales of PRODUCT2 to CUSTOMER2 are depicted in cell $256_{2,2}$. As can been seen in FIG. 2C, a precipitous drop in sales of PRODUCT2 is the results of CUSTOMER2 not purchasing PRODUCT2 in year 1998.

Further insight into the precipitous increase in sales of PRODUCT3 may be obtained by comparing cell $236_{6,3}$ (FIG. 2B) to cell $256_{6,3}$ (FIG. 2C). Comparison of those cells indicates that the precipitous increase in sales of PRODUCT3 is due to significant purchases of PRODUCT3 by CUSTOMER6. The data presented FIGS. 2B and 2C suggest that the drop in sales of PRODUCT2 may be unrelated to the increase in sales of PRODUCT3. Accordingly, by incorporating data from multiple sources, a business analyst may obtain a much different insight into a business event than by merely looking at one type of data. Accordingly, a business intelligence application must incorporate data from multiple sources and should be flexible enough to allow that data to be manipulated in ways appropriate for any business scenario.

Figure 3:
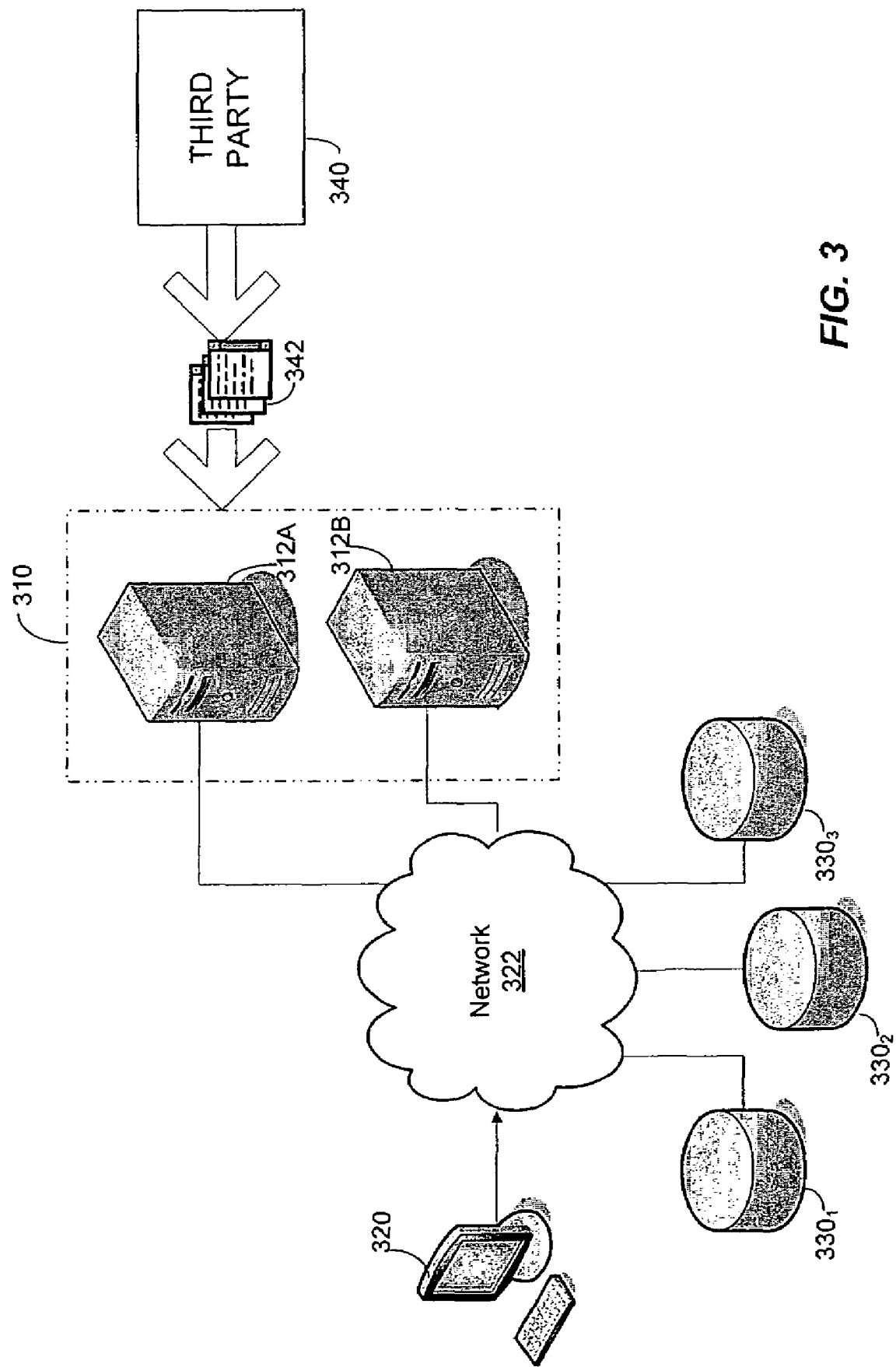
FIG. 3 is a sketch of an implementation of a business intelligence application according to an embodiment of the invention.

FIG. 3 illustrates a business intelligence application according an embodiment of the invention that may provide the desired flexibility. In the embodiment illustrated, the business intelligence application has a client-server architecture. One or more clients, here depicted by client 320, interact with a server 310 over a network 322. Client 320 may be any suitable computing device, such as a desktop work station. However, the specific hardware used to implement client 320 is not critical to the invention and client 320 may be implemented on a portable computer, mobile device or any other suitable hardware. Also, through one client device is shown for simplicity, an actual application may contain numbers clients.

Network 322 may be any suitable network. In the embodiment illustrated, network 322 is a wide area network maintained by an enterprise running the business intelligence application. However, any suitable network, including the Internet, may be used.

Server 310 may be physically implemented on any one or more computing devices. In the embodiment illustrated, server 310 is shown to execute on physical devices 312A and 312B. However, any number or type of physical devices may be used to implement server 310.

Server 310 may interact with one or more data sources maintained by the enterprise. In the embodiment illustrated, interactions with the data sources may be performed over network 322. In the embodiment illustrated, three data sources $330_1$, $330_2$ and $330_3$ are shown. Such data sources may be maintained by IT systems separate from the business intelligence application and may contain any suitable types of data. For example, data sources may contain sales data, data on defect rates or data on customer complaints. Regardless of the number and type of data sources, server 310 is programmed to interact with these data sources to provide data processing functions in response to user inputs entered at client 320.

In the embodiment illustrated, interactions between client 320 and server 310 are managed by a framework on client 320 and a corresponding framework on server 310. In the embodiment illustrated, the Microsoft®.NET programming environment is used to implement the framework. However, any suitable framework may be used.

On the client 320, the framework is configured to implement a client shell for a business intelligence application. On server 310, the framework is configured to implement a service that interacts with the client to create a business intelligence application.

The client shell and service on server 310 may be programmed to perform operations desirable in a business intelligence application. Such operations may include retrieving and displaying certain types of data. Such operations may also include performing predefined analysis functions on data obtained from one or more of the data sources.

However, the predefined functions of the shell and service are unlikely to support all business analysis operations that a user may desire be performed. Accordingly, the business intelligence application depicted in FIG. 3 is extensible. A third party 340 may provide extension modules that alter the functions that can be performed by the business intelligence application. Third party 340 may be any party capable of providing computer readable modules 342 separate from predefined configuration of the business intelligence application. Even, the operator of the enterprise depicted in FIG. 3 or the developer of the preconfigured business intelligence application may be regarded as the third party providing extension modules.

In the embodiment illustrated, extension modules 342 are provided first to server 310. Some or all of the extension modules 342 may be processed on server 310. However, some of the extension modules 342 may be used on client 320 to perform business analysis functions. When a user interacting with a business intelligence application through client 320 requests that a function be performed that uses an extension module 342, server 310 may provide that module to client 320 over network 322, if the module is not already available on client 320.

Providing extension modules, such as modules 342 in this fashion may simplify the deployment and maintenance of a business intelligence application. In the embodiment shown, execution of business analysis functions requested by a user through client 320 may involve both interactions between client 320 and server 310 and interactions between server 310 and one or more of the data sources $330_1 \ldots 330_3$. Accordingly, each extension function may involve two or more modules, one on client 320 and one on server 310. These modules may need to interact to perform the desired function. By providing extension modules to client 320 from server 310 as extension functions are requested, client 320 will always have access to modules that can interact with corresponding modules on server 310. Maintaining consistency in this fashion can be advantageous in a large enterprise containing multiple clients 320 that would otherwise be difficult to keep updated with changes to server 310. Such a capability may be particularly advantageous in a business intelligence application in which the functions to be performed may be changed frequently as business conditions change.

In the embodiment illustrated in which the Microsoft®.NET framework is used, automatic updates may be implemented by implementing extension functions as "click-once" applications. However, any suitable implementation may be used.

Extension modules 342 may be in any suitable form and used in any suitable way with client 320 or server 310. For example, extension modules 342 may contain computer readable information that is used in multiple ways. An extension module may consist of computer executable instructions such that when the module is executed within the framework on either a client 320 or server 310, a function defined by the extension module is performed. Moreover, it is not necessary that the computer-executable instructions be stored within the modules. The modules may contain links to the actual instructions, which are then accessed when the module is executed. However, not all extension modules may contain computer executable constructions. Some extension modules may contain information used in performing data processing functions. For example, one or more extension modules may contain templates that define how data is displayed. Other extension modules may contain metadata, defining a selection of data values or a mapping between data values obtained from data sources $330_1, \ldots 330_3$ and particular fields in templates.

Executable extension modules may be executed in any suitable way. In the embodiment illustrated in FIG. 3, extension modules are executed within the frameworks provided on either client 320 or server 310. However, the extension modules may have different structures to create different user experiences. For example, some extension modules, when executed, may appear to a user as separately executing programs. However, other executable extension modules may be "plug-ins" that alter the appearance of the user interface provided by a shell for the business intelligence application.

Figure 4:
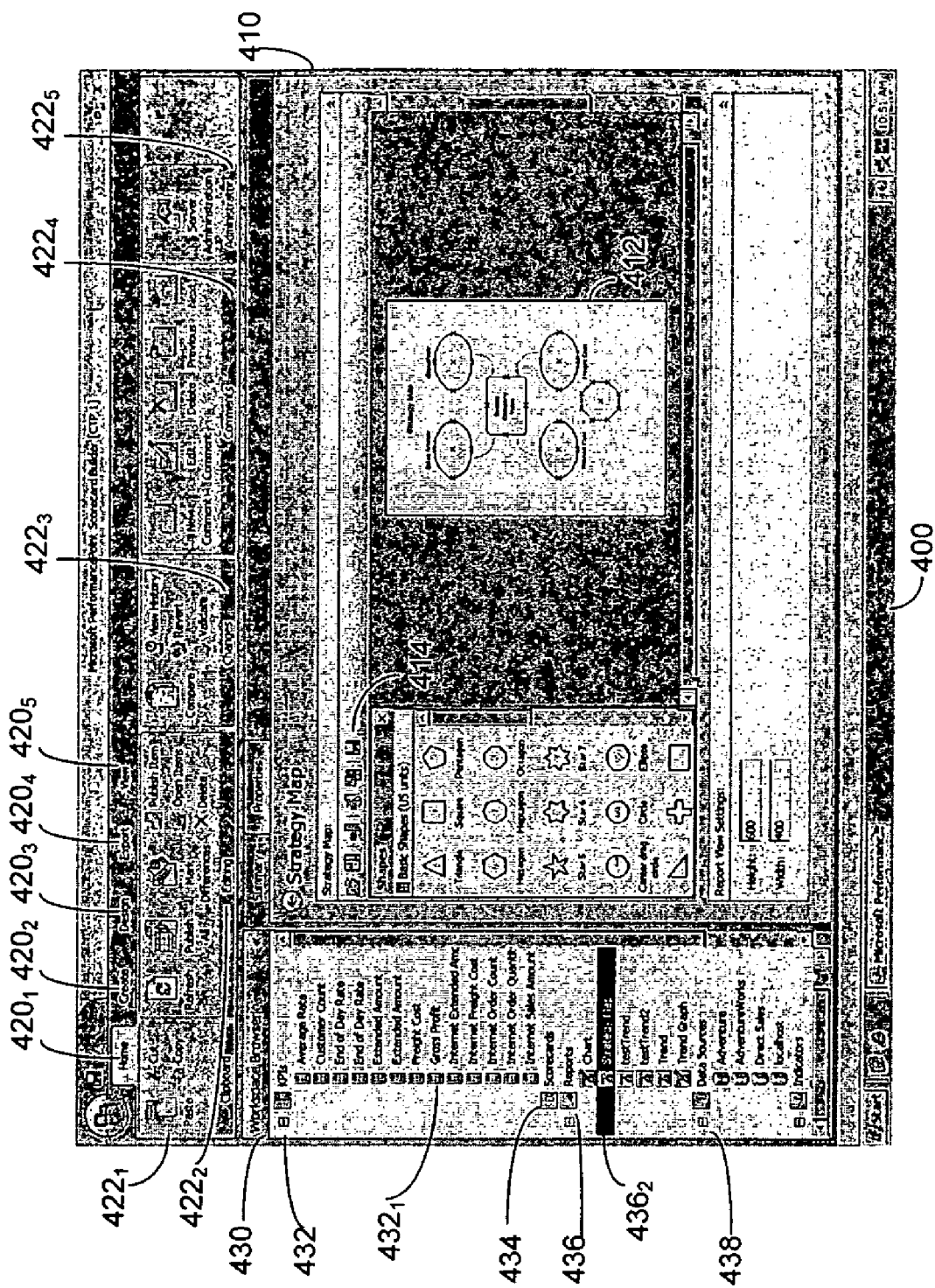
FIG. 4 is a sketch of a graphical user interface provided by a business intelligence application according to an embodiment of the invention.

FIG. 4 depicts a graphical user interface 400 that may be presented to a user of client 320 by a shell of a business intelligence application according to an embodiment of the invention. In the embodiment illustrated, the shell is implemented on the Microsoft®.NET framework, though any suitable programming environment may be used to implement the shell providing graphical user interface 400. In the illustrated embodiment, the graphical user interface 400 includes a workspace 410. Various controls throughout graphical user interface 400 may be used to alter the types of information presented to a user in workspace 410 or to alter the types of actions taken by the business intelligence application in response to user input through workspace 410. In the embodiment shown, a workspace browser 430 is displayed for a user, containing objects that may alter information appearing in workspace 410. Additionally, a series of menus $420_1, 420_2 \ldots 420_5$ are provided to allow a user to access control objects.

As conventional graphical user interface, the user may interact with graphical user interface 400 using computer input output devices, such as a keyboard or a mouse.

Each of the menus $420_1 \ldots 420_5$ has multiple sub-menus associated with it. In the embodiment illustrated, menu $420_1$ has been selected causing sub-menus $422_1 \ldots 422_5$ to be displayed. Each sub-menu contains control objects, of which control object $424_1$ in sub-menu $422_1$ is numbered. Each of the control objects may have a computer executable module associated with it such that when a user selects the control object, the computer executable module associated with that control object may be executed.

The control objects accessed through the menus may perform general functions, such as are found in many computer applications. In the example pictured in FIG. 4, control object $424_1$ performs a paste function, such as is common in many computer applications.

However, other control objects may execute functions related to business intelligence applications. Such objects may be predefined as part of the shell or may be displayed through user interface 400 as a result of an extension module being downloaded to client 320. In the embodiment illustrated an extension module may be configured as a "plug-in" to appear in a menu as shown in FIG. 4 in the same way that objects that are predefined as part of the business intelligence application. For an extension module to define a control object to appear in a menu, the extension module may contain an executable portion, defining the function that is performed when the control object is selected. Additionally, the extension module may contain information defining an icon to represent that control object. Further, the extension module may contain an identification of a menu and sub-menu under which the control icon is to appear. An extension module 342 may specify a specific command to be added to an existing menu. Alternatively or additionally, an extension module may specify a sub-menu to be added under an existing menu or may specify an entirely new menu to be presented. In the embodiment illustrated, the framework is adapted to present on graphical user interface 400 an appropriate display that incorporates the control object icons when specified in this fashion.

As with menus $420_1 \ldots 420_5$, workspace browser 430 also displays objects in an hierarchical fashion, making it possible to specify where objects provided as extensions should appear in workspace browser 430. For example, in the state depicted in FIG. 4, workspace browser 430 displays four "tabs." KPI tab 432 contains objects that, when executed, cause workspace 410 to display information about a key performance indicator (KPI). In this embodiment, a KPI represents a function performed on data extracted from one or more data sources. Each KPI may combine data to produce a metric that may aid a business analyst investigating a business situation. For example, object $432_1$, when selected, may cause the client shell to display information within workspace 410 relating to a key performance indicator involving the computation of gross profit.

Workspace browser 430 shows other tabs that may contain other types of objects. In the specific example illustrated, a score card tab 434, a report tab 436 and a data source tab 438 are pictured. However, these tabs are for illustration only and a business intelligence application may be constructed with more or fewer tabs in a workspace browser.

In the example illustrated, no objects are defined in score card tabs 434. However, when an object under scorecard tab 434 is selected, workspace 410 may be used for a user to manipulate a scorecard or use it to display a "view" of data that has been selected. As shown, multiple objects are defined in report tab 436 which, similar to scorecard objects, may be selected to allow a user to manipulate a report or use it to display a view of data that has been selected. Similarly, multiple objects are defined within data sources tab 438. When an object is selected from data sources tab 438, the client shell for the business intelligence application displays in workspace 410 information relating to the selected data source so that a user may perform operations that specify a view from that data source or otherwise perform operations relating to that data source.

The command objects appearing in workspace browser 430 may be predefined as part of the business intelligence application or may be displayed as a result of extension modules being downloaded to client 320 (FIG. 3). In the embodiment illustrated, the framework executing on client 320 is adapted to display icons for objects in workspace browser 430 as plug-ins. For an extension module to define a plug-in to workspace browser 430, the extension module may contain computer-readable information used in the performance of a function when the object is selected. That information may be in the form of computer-executable instructions but may alternatively or additionally be in the form of formatting information, metadata or may be in any other suitable form. Additionally, the extension module may define an icon that the framework may use to create a visual representation of the object. Additionally, the extension module may contain information defining where, with in the hierarchy of objects displayed in workspace browser 430 that objects should appear. However, any suitable method may be used to display an object within workspace browser 430 or make it available through a user interface on client 320.

In the operating state illustrated in FIG. 4, a user has selected object $436_2$ from reports tab 436. The selection of object $436_2$ causes a report entitled "Strategy Map" to appear in workspace 410 Other objects in report tab 436 may be selected to display information relating to other reports. Regardless of the report selected, a user may then interact through workspace 410 to perform functions on the selected report. In the operating state illustrated in FIG. 4, workspace 410 displays a selected report in a mode in which the report may be edited. As part of editing, the user may specify the format of the report or may map certain types of information to certain elements of the report. The information mapped to the report may be data, taken directly from a data source. Alternatively, or additionally, the information mapped to an element of a report may be processed data, such as a key performance indicator.

The executable portion of an objection may be specified in any suitable way. For example, the executable portion may be a series of computer executable instructions that collectively define the processing desired when the object is selected. Alternatively, the executable portion of an object may contain a link to a other executable objects. Those executable objects may be on client 320 or may be on server 310 (FIG. 3). In some embodiments, the executable portion of an object may contain a combination of computer executable instructions that are executed on client 320 and links to one or more objects on server 310 that are access in response to a selection of the object.

Figure 5:
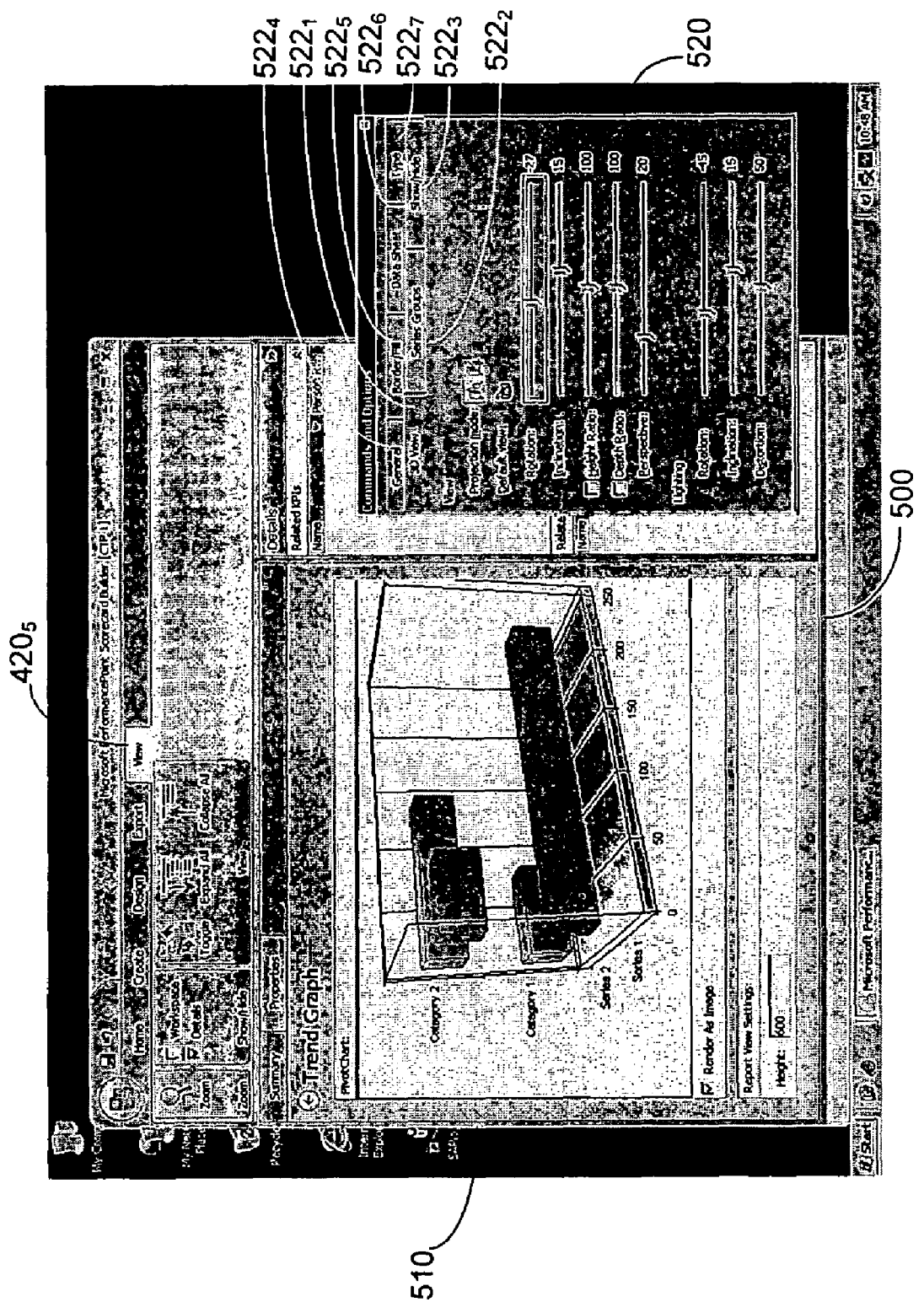
FIG. 5 is a sketch of a graphical user interface provided by a business intelligence application according to an embodiment of the invention.

As a further example of function that may be performed by a business intelligence application according to an embodiment of the invention, FIG. 5 illustrates a user interface 500 when object $436_6$ has been selected from report tab 436. In contrast to FIG. 4, which shows in workspace 410 information relating to defining a report, FIG. 5 shows an operating state in which a report is being viewed. The operating state of FIG. 5 is entered when a user selects menu $420_5$ indicating that the user wants to view the report rather than manipulate the data selected when the report is executed or other functions relating to defining the display of information. Accordingly, workspace 510 shows the data mapped to the selected report, here entitled "trend graph" displayed in a format prescribed by a report template associated with the report "trend graph."

In addition, command window 520 is displayed, presenting control objects to a user that may be used to control the display of the report in workspace 510. Command window 520 allows a user to issue multiple commands effecting the report in workspace 510. In the operating state illustrated command window 520 displays command objects that a user may manipulate to change the appearance of the report, such as causing the three-dimensional image depicted to be rotated or to change the shading or other visual attributes. Further, command window 520 shows a series of tabs, $522_1 \ldots 522_7$. Each tab, when selected by a user, may alter the specific command objects appearing in command window 520. As can be seen, a wide range of control functions may be provided for use in connection with a report.

In the embodiment illustrated, workspace 510 shows a three-dimensional figure with bars representing values of data objects that have been mapped to specific elements of the report. In the embodiment illustrated, the specific mapping of data objects to report elements may be provided by a user interacting with client 320, which provides some flexibility in specifying the type of information displayed. Further, the report template may be provided either as a part of the business intelligence application or by a third party as an extension module, which may provide significantly more flexibility. Also, the information necessary to implement command window 520 may be provided in conjunction with the report template, and may either be provided as a part of the business intelligence application or may be provided as an extension module.

Figure 6:
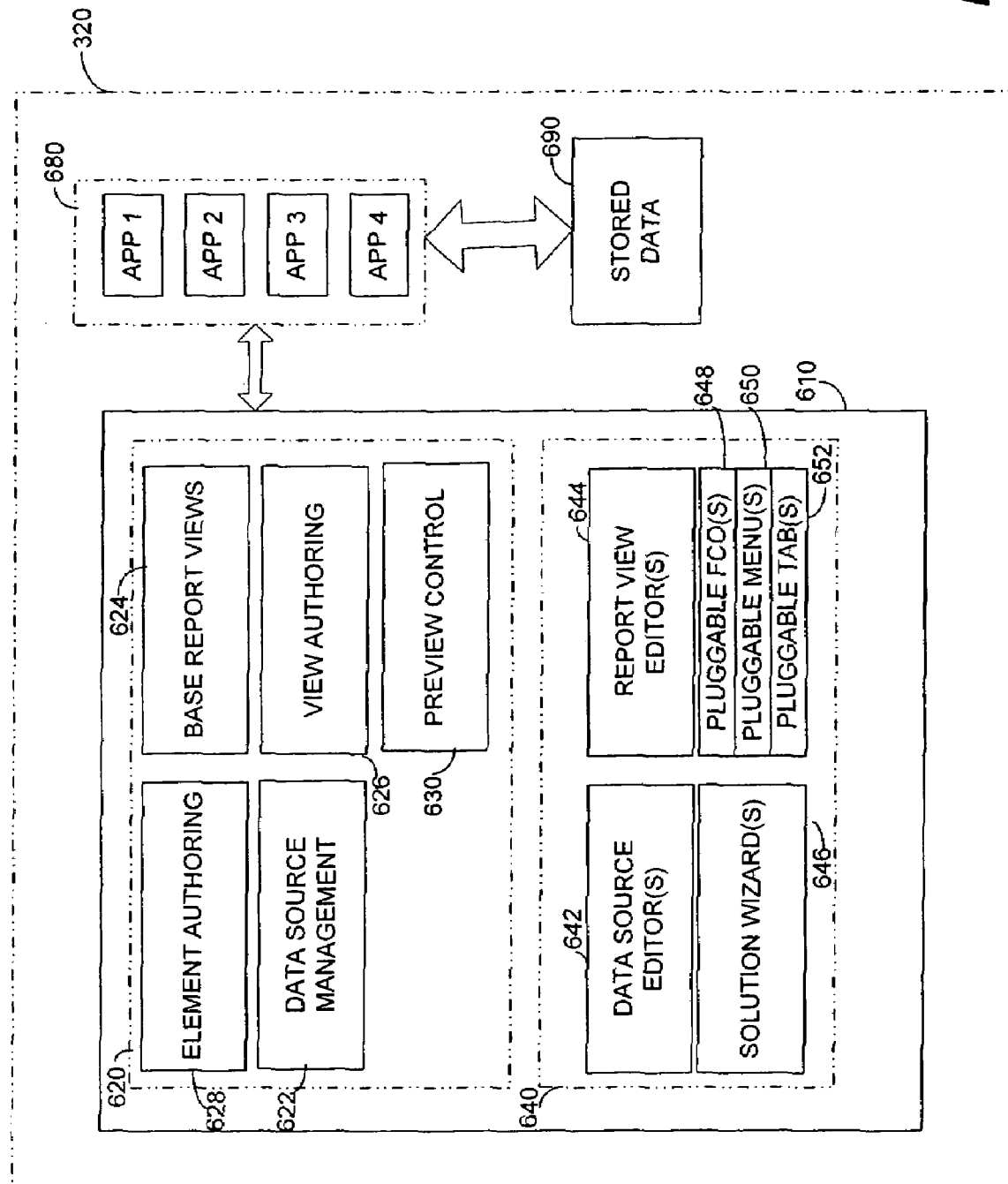
FIG. 6 is a block diagram of software components that may reside on a client to implement a business intelligence application according to an embodiment of the invention.

An extensible business intelligence application may be implement in any suitable way to provide flexibility in implementing a range of functions, of which only a small number are depicted in FIGS. 4 and 5. FIG. 6 illustrates a software architecture of the client portion of a business intelligence application according to an embodiment of the invention. FIG. 6 illustrates software executing on a client 320. In addition to the business intelligence application, client 320 may contain applications 680, such as are found on a conventional computer. Additionally, client 320 may contain an operating system that provides operating system services such as data storage 690.

In the embodiment illustrated, client computer 320 is configured with a framework 610 within which the business intelligence application may execute. Framework 610 may facilitate interaction with a server running a complimentary framework and may provide code access security to provide a "safe" runtime environment. In the embodiment illustrated, framework 610 is provided by the Microsoft®.NET framework. However, any suitable framework may be employed. Furthermore, embodiments may be constructed without a framework, such as by implementing functions of the framework used by the business intelligence application within the business intelligence application or by accessing comparable functions in an operating system (not shown).

Framework 610 provides underlying functionality for the business intelligence application, including functions to display and receive information through a user interface and to interact with a server. Components executing within the framework define the functionality that configures the framework to create a business intelligence application. In the embodiment illustrated, the components of the business intelligence application are divided into preconfigured components 620 and extension components 640. The preconfigured components 620 may be supplied as part of the business intelligence application and define a client shell for the business intelligence application. The extension components 640 may be supplied by a third party that provides extension of modules 342 (FIG. 3). Any number or type of components may be provided as part of preconfigured components 620 or extension components 640.

In the embodiment illustrated, preconfigured components 620 contains components that execute functions that select data for viewing or manipulate the manner in which that data is displayed. Any number or type of components may be included. In the embodiment illustrated, preconfigured components 620 includes data source management component 622, base report view component 624, view authoring component 626, element authoring component 628 and review control component 630.

Data source management component 622 performs functions when a preconfigured data source presented under tab $436_6$ (FIG. 4) is selected. Such functions may allow data to be retrieved from or written to any of a number of data sources that the business intelligence application is configured to access.

Base report view component 624 provides functions associated with report views that the business intelligence application is preconfigured to support. Base report view component 624 may contain computer-readable information that defines one or more report formats and functions that may be performed using those report formats.

View authoring component 626 contains computer-readable information used to perform functions relating to defining one or more views of data to be selected from a data source for analysis. These tools may define filters for selecting data used in a view or specify a view in any other suitable way.

Element authoring component 628 contains computer-readable information used to specify operations that objects added as extension modules can support. For example, functions performed by element authoring component 628 may specify that an object can support operations such as save, undo and redo.

Preview control component 630 contains computer-readable information used for controlling the preview of information that will be displayed on client computer 320 when a report or scorecard is viewed. However, rather than display information from data sources obtained by server 310, preview control component may generate the display. Though, functions performed by preview control component 630 may include obtaining data from server 310 to generate a preview so that the result of displaying a scorecard or report may be observed while the report or scorecard is being authored.

Preconfigured components 620 allow the business intelligence application to perform many data analysis functions. However, in many instances, preconfigured components will not perform desired functions. Accordingly, extension components 640 may be provided to perform functions that are not performed by preconfigured components 620. In the embodiment illustrated, extension component 640 may be downloaded from server 310. Though, extension components 640 may be loaded into client 320 from a disk or in any other suitable way.

In the illustrated embodiment, extension components 640 contain data source editors 642, report view editors 644, solution wizards 646, pluggable first class objects (FCOs) 648, pluggable menus 650 and pluggable tabs 652.

Each data source editor 642 may contain computer-readable information that allows a user to edit one or more data sources. Data source editor 642 differs from data source management component 622 in that component 622 is configured to interact with a limited number of data sources with which the business intelligence application was preconfigured to interact. If, to perform business intelligence functions, data from other sources is to be accessed, then data source management functions for those extension sources may be provided through data source editor 642.

Similarly, report view editors 644 provide functions similar to those of base report view component 624. However, base report view component 624 is configured to operate on predefined reports. As the business intelligence application is extended to contain new report formats, report view editors 644 can execute functions related to those reports.

As described above in connection with FIG. 4, multiple types of objects may be provided in a format that the framework may incorporate as plug-ins. For example, one or more tabs may be defined to plug into workspace browser 430. The computer readable information necessary to define any plug in tabs is contained in component 652.

Similarly, one or more menus may be defined as plug-ins. Accordingly, component 650 contains computer readable information that defines menus to be plugged into the shell provided for the business intelligence application.

Also, as described in connection with FIG. 4, objects may be plugged into tabs and menus. These objects may be considered first class objects For example, as shown 0in FIG. 4, a control object under a menu or a tab in workspace browser 420 may be defined as a plug-in. Accordingly, component 648 contains computer-readable information that define the pluggable first class objects that are incorporated into the shell for the business intelligence application.

More generally, computer-readable information used to perform any suitable function may be incorporated into extension component 640. In the example, illustrated, component 646 is shown containing solution wizards. Each solution wizard may contain computer executable instructions that, when executed, display information guiding a user through a task. In the specific example illustrated, solution wizards 646 guide a user through tasks related to creating objects. However, the extension components depicted in FIG. 6 are illustrative only, and components performing any suitable function may be incorporated.

In some embodiments, computer-executable instructions to perform all functions associated with a business intelligence application may be incorporated within framework 610, either as part of preconfigured component 620 or extension component 640. However, in other embodiments, components of the business intelligence application may interact with other software on client 320. In the embodiment illustrated, framework 610 is adapted to interact with applications 680 to access components of those applications.

For example, user interface 400 (FIG. 4) is displayed as a result of operation of the business intelligence application. However, workspace 410 shows a document 412 in a format that may be operated on by a drawing program, such as MICROSOFT® VISIO or POWERPOINT drawing programs. If one of the applications 680 is such a drawing program, applications 680 may contain executable components that perform functions that can be used to make the desired display in workspace 410. Accordingly, the software used to perform business data analysis functions may be installed as part of applications 680 and framework 610 may access those components to perform the functions.

In the embodiment illustrated, applications 680 are stored as DLLs and framework 610 accesses the functions provided by application program 680 by calling elements in the DLLs rather than launching one of the applications 680. However, any suitable mechanism may be used to access all or portions of applications 680.

In the embodiment illustrated, scorecard and report templates are defined in preexisting applications, such as word processors, spreadsheets or drawing programs. Accordingly, the business intelligence application may utilize components of applications 680 to display or edit reports or scorecards.

The business intelligence application may also take advantage of other functions provided by applications. For example, in the embodiment illustrated, applications 680 are configured to store information in file system 690. The business intelligence application may also take advantage of file manipulation functions associated with applications 680 to store and retrieve information in file system 690. For example, FIG. 4 shows a report being defined as a page 412 manipulated by elements of a drawing program. The drawing program may provide functions for storing data defining a page, which may be used to store page 412. Accordingly, when page 412 is stored by the drawing program, information provided through the business intelligence application may be stored along With it.

As a specific example, if as part of editing the report pictured in workspace 410, a user specifies metadata, mapping specific data elements to elements of the report, that metadata will be saved as part of storing page 412 by the drawing application program. In this way, storage of metadata associated with reports may be readily facilitated. However, metadata associated with reports may be stored in any suitable way.

Figure 7:
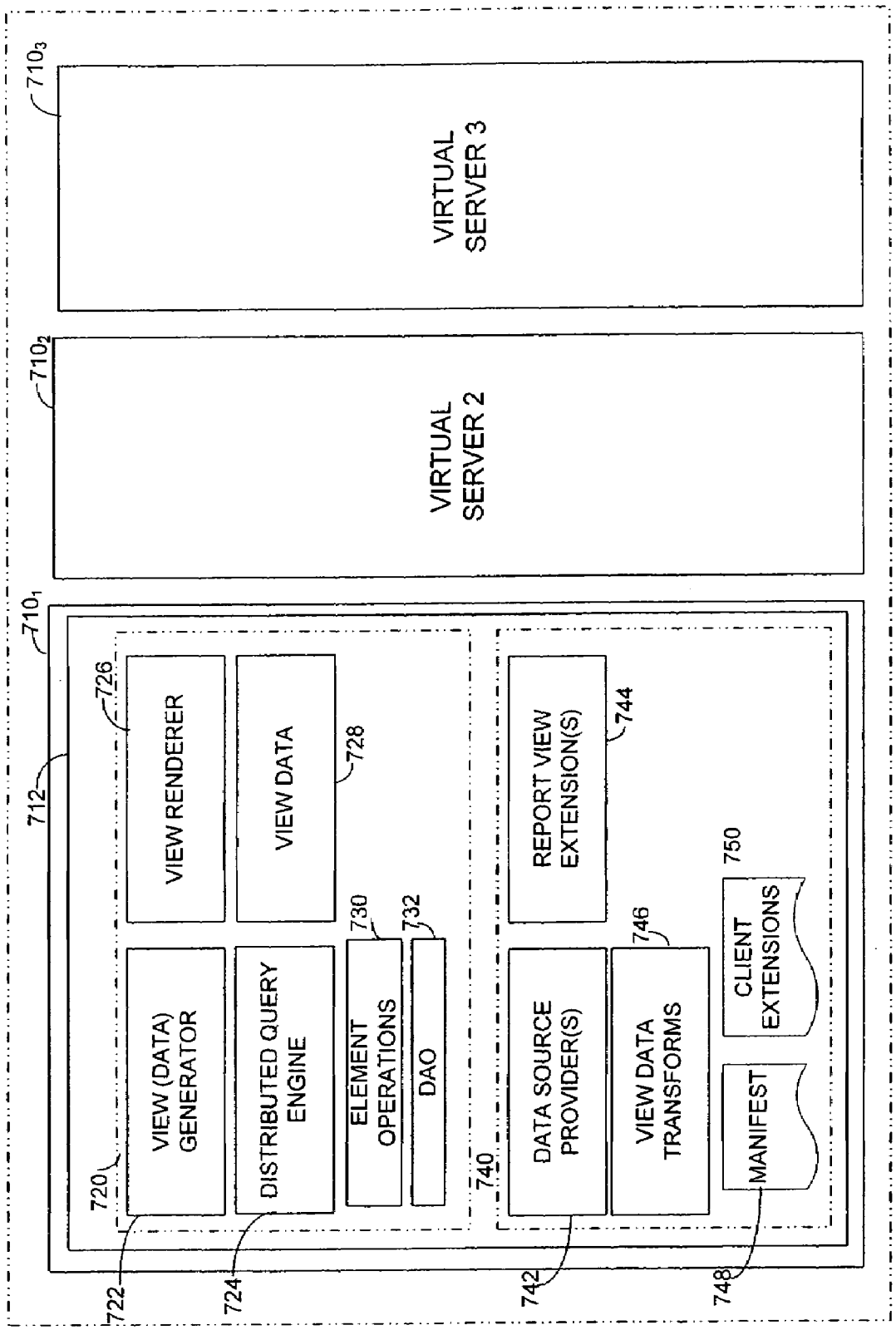
FIG. 7 is a block diagram of software components that may reside on a server in a business intelligence application according to an embodiment of the invention.

Turning to FIG. 7, a block diagram of the software architecture on a server 310 is illustrated. In the embodiment illustrated, the server-side of business intelligence application is implemented on a virtual server $710_1$. Because the business intelligence application is designed to accept extensions that may be provided by any number of sources, it is possible that the business intelligence application, though thoroughly tested and trusted when installed, may be modified as a result of one or more extensions to perform malicious functions. In this context, malicious functions are functions that corrupt data or interfere with any other functions. The malicious functions could be performed intentionally or could be performed unintentionally, such as through a coding error or unintended interaction between components.

By executing the business intelligence application within a virtual server $710_1$, the amount of computing resources consumed by the business intelligence application may be limited by constraints imposed on virtual server $710_1$. Consequently, applications executing within virtual server $710_2$ and $710_3$ or otherwise outside of virtual server $710_1$, are not impacted.

Though the business intelligence application may be executed on virtual server $710_1$, a framework 712 may be used. Framework 712 may restrict functions performed by components of the business intelligence application to preclude execution of any function deemed malicious. In the embodiment illustrated, framework 712 is the server side of the .NET framework. In addition to safeguarding server 310 from execution of malicious code as part of the business intelligence application, framework 712 interacts with framework 610 on client 320 to facilitate client/server interactions.

As with client 320, the business intelligence application on server 310 contains preconfigured components 720 and extension components 740. Any number or type of preconfigured components and extension components may be used. In the example of FIG. 7, preconfigured components 720 include view generator 722, distributed query engine 724, view renderer 726, element operations 730 and data access object 732.

As described above, a business analysis application may present information to a user formatted according to a scorecard or formatted according to a report. In the embodiment illustrated, data used for either a scorecard or a report is collected from views of data in one or more data sources. In the embodiment illustrated, the data is gathered and formatted by server-side components of the business intelligence application. To provide information, view generator 722 interacts with distributed query engine 724. View generator 722 may interact with view authoring component 626 on client 320 to define the data required for a view. The definition of the view may be provided to distributed query engine 724, which then queries data sources to obtain the desired data. The resulting view data 728 may be processed further on server 310.

In the embodiment illustrated, view renderer 726 further processes view data 728. For example, when information is requested for presentation in accordance with a particular scorecard view, view renderer 726 formats view data 728 in accordance with the scorecard format. Likewise, if data is requested in a report format, the view renderer 726 formats view data 728 into the appropriate format. View renderer 726 may obtain information on the necessary format through interaction with base report view component 624 or in any other suitable way.

View renderer 726 may access definitions for scorecards, report views and other first class objects (FCOs), which may be stored in a metadata store on server 310. Data access objects (DAOs) 732 are provided for use by the view renderer in accessing these definitions. The data access objects 732 implement element operations 730, such as create, read, update, delete, versioning, reverting an object comparison. However, the components illustrated in FIG. 7 provide one example of a server-side implementation of a business intelligence system, and any suitable implementation may be used.

Preconfigured components 720 may be configured to implement any of a number of data analysis functions. However, in some scenarios, the preconfigured components 720 may not perform all desired data processing operations. Accordingly, extension components 740 may be included to provide additional functionality. In the embodiment illustrated, extension components 740 include components such as data source provider adapters 742. Data source provider adaptors 742 may interface with distributed query engine 724 and any data sources that distributed query engine 724 is not preconfigured to access. In this way, distributed query engine 724 may interface with any data source, even those with which it is not initially configured to interface.

Additionally, report view extensions 744 may be included to provide appropriate server-side actions in conjunction with reports defined as an extension component on client 320. For example, when an extension report is displayed for a user, the user may perform one or more manipulations that should change the information displayed. For example, a user may specify a different page filter or may specify a different row, column or cell within a data table to use in an analysis function defined in conjunction with the report. Similarly, the user may specify a different key performance indicator to use in conjunction with the report. Regardless of the specific manipulation performed by the user, the server-side component of the business intelligence application can be programmed to take appropriate action in response to that manipulation. In the embodiment illustrated, programming may be contained within a report view extension 744.

Other extension components 740 may perform processing on view data 728 not supported by preconfigured components 720. As a further example, view data transforms 746 may be included. View data transforms may perform any rendering functionality that is not handled by preconfigured components 720. The transforms contained within view data transforms 746 may be performed on data before or after it is provided to view renderer 726.

Additionally, extension components 740 may contain one or more components to provide extension components to client 320. For example, a manifest 748 and client extension 750 are shown. Manifest 748 may be associated with a function that may be initiated by a user through client 320. In this example, manifest 748 contains a list of computer readable components, including version numbers, that should be present on client 320 to perform the desired function. Client extension 750 contains copies of the computer readable modules listed in manifest 748. These client extensions 750 may be supplied to client 320 if not already present on client 320. Any suitable method may be used to compare the modules available on client 320 to the manifest 748. For example, server 310 may communicate manifest 748 to client 320, and client 320 may compare manifest 748 to modules it has. Client 320 may then request any modules in client extension 750 that it does not have.

In the embodiment illustrated, framework 610 (FIG. 6) and framework 712 may automatically manage the interaction that determines which client extensions 750 are need on client 320 to perform a function and may download the required client extensions 750. However, any suitable mechanism may be used for distributing client extensions 750.

Figure 8:
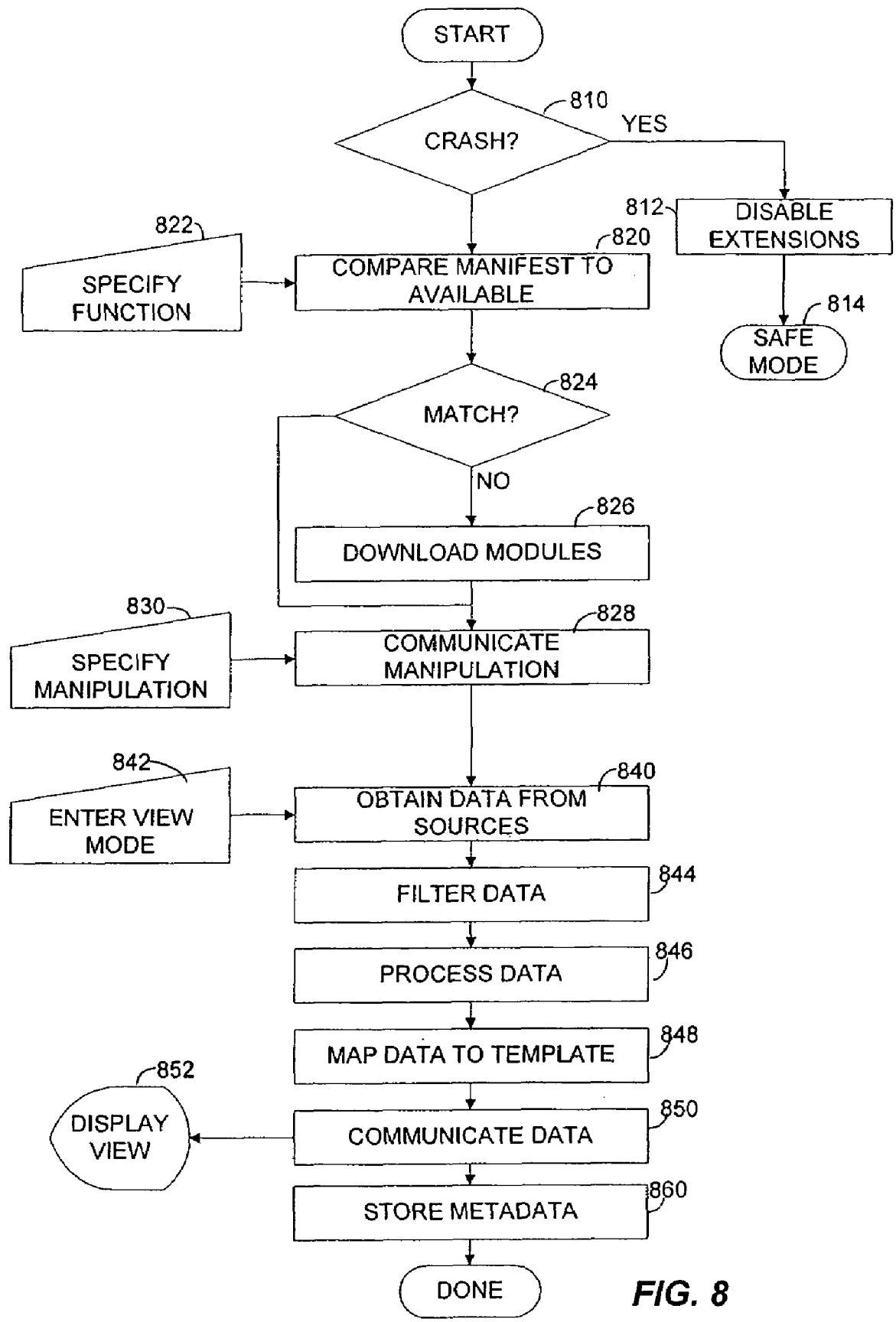
FIG. 8 is a flow chart of a process that may be performed by a business intelligence application according to an embodiment of the invention.

Turning to FIG. 8, a process performed by the interaction of a client-side business intelligence application and a server-side business intelligence application according to an embodiment of the invention is illustrated. The process of FIG. 8 can be initiated in any suitable way. For example, the process may be initiated by a user launching the business intelligence application from client 320.

Regardless of how the process is initiated, processing proceeds to decision block 810. At decision block 810, the process branches depending on whether the business intelligence application previously crashed or otherwise experienced an error condition while an extension module was operating. If such a crash occurred, the process branches to block 812 where any extensions on client 320 are disabled. The extensions may be disabled in any suitable way, which may include simply not loading the extensions that were present on client 320 when the crash occurred.

Once the extensions are disabled, processing proceeds to termination point 814. At termination point 814, the business intelligence application executes in safe mode. Safe mode may be implemented in any suitable way. In some embodiments, execution in safe mode may be the same as execution in a normal mode, with the exception that extensions are disabled. In other embodiments, execution in safe mode may also provide a user access to debugging tools or other facilities to aid the user in investigating the cause of the crash detected at decision block 810.

Conversely, if no prior crash is detected, the process branches from decision block 810 to block 820. Processing at block 820 may be based on user input 822 specifying a function to be performed by the business intelligence system. In the embodiment illustrated, the functions specified by user input 822 involves execution of a function that is not a part of the preconfigured business intelligence application and requires client-side extensions to be loaded onto client 320. Accordingly, a manifest associated with the functions specified by user input 822 is compared to available modules on the client.

At decision block 824, the process branches depending on whether the available modules on the client match the manifest. In the embodiment illustrated, an available module matches the manifest only if the specified module, including the version number, matches. In this way, a client may be automatically updated to ensure that it contains versions of software components compatible with software component on a server with which the client interacts.

If the available modules on the client do not match the modules on the manifest, processing branches to block 826. At block 826, any modules on the manifest that are not available on the client are downloaded. Thereafter, processing proceeds to block 828.

If the available components within the client match the components on the manifest, processing branches directly from decision block 824 to block 828. Regardless of how processing reaches block 828, at block 828 actions are taken based on user input 830 specifying a manipulation. User input 830 may specify one or more manipulations to be performed. The manipulations may specify that different or additional data be obtained for analysis or may alter the nature of the scorecard or report used to present data. By enabling a user to specify input 830, a user may interactively control the business intelligence system to perform data analysis functions.

The objects manipulated as a result of user input 830 may be part of the preconfigured components or may be extension components.

In response to user input 830, information defining the manipulation requested by the user is communicated to the server at block 828.

A user may thereafter provide input 842 indicating the business intelligence system should enter a mode of displaying data formatted in accordance with the manipulations specified by input 830. Thereafter, data may be obtained and presented to the user. Accordingly at block 840, queries are issued to data sources to obtain data necessary to present the requested information to the user. The data may be obtained from sources for which interfaces are defined as part of the preconfigured business intelligence application or may be accessed using interfaces defined by third party extensions provided to the business intelligence system.

The process may then proceed to block 844. At block 844, data may be filtered to select only data required to supply a view requested by a user. Filtering at block 844 may also be performed by components that are part of the preconfigured business intelligence system or by components that are extensions to that system.

If other data processing is required, the processing continues to block 846 where that processing is performed. As with blocks 840 and 844, data processing performed at block 846 may be performed by components that are part of the preconfigured business intelligence application or by components that are extensions of the business intelligence application.

Once desired processing is completed, the process may continue to block 848. At block 848, the processed data may be mapped to a template. Processing at block 848 may map data to a scorecard template, a report template or any other suitable template. More generally, processing at block 848 may entail formatting data for presentation to a user in any suitable way.

Once the data is formatted, the data may be communicated. In the embodiment illustrated, processing at blocks 840, 844, 846 and 848 are performed on a server. Accordingly, processing at block 850 may entail communication of the formatted data to a client for presentation to a user accessing the business intelligence application through the client. However, the data may be communicated in any suitable way and does not necessarily entail communication for display to a user. For example, data may be communicated to a subsequent data processing system or application for further computerized data processing.

In the embodiment illustrated, the data is communicated to a client for display to a user at block 852. Thereafter, some or all of the processed steps depicted in FIG. 8 may be repeated. For example, upon viewing the data, a user may specify a further function to be performed or may specify further data manipulations. If a user specifies further actions, some or all of the processing illustrated in FIG. 8 may be repeated.

When a user completes processing, data defining the manipulations input by the user may be stored. In an embodiment in which templates are manipulated using applications, such as applications 680 (FIG. 6), the information on the manipulations may be stored as metadata in conjunction with files or other data objects operated on by those applications. However, the format in which information on user specified manipulations is stored is not critical to the invention and any suitable method of storage may be used. However, by storing information about user specified manipulations as metadata associated with templates, when the templates are accessed by the user at a later time, the metadata may be available for reuse.

Regardless of whether and how data defining user specified manipulations is stored, the process of FIG. 8 may then terminate.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. Computer apparatus comprising:
   a network interface; and
   a computer-readable medium having computer-executable components comprising:
   a framework for interacting through the network interface with a server to implement a business intelligence application in an enterprise, the framework adapted to:
   perform a plurality of first data processing functions through interaction with the server, the first data processing functions being related to manipulation of data in one or more data stores containing data relating to the operation of the enterprise;
   receive a user input specifying a second data processing function, different than data processing functions of the first plurality of data processing functions;
   determine whether a computer-executable module for performing the second data processing function does not reside on the computer apparatus; and
   obtain through the network interface the computer-executable module, the computer-executable module being operable to interact with at least one corresponding computer-executable module on the server to perform the second data processing function.

2. The computer apparatus of claim 1, wherein:
the framework is adapted to obtain the computer-executable module through the network interface from the server.

3. The computer apparatus of claim 1, wherein the plurality of first data processing functions comprise:
receiving a report template;
receiving data; and
displaying the data in a format prescribed by the report template.

4. The computer apparatus of claim 3, wherein the computer-executable components further comprise at least one application capable of execution outside the framework, the application adapted to operate under control of the framework to present the data in accordance with the report template.

5. The computer apparatus of claim 4, wherein:
the at least one application is adapted to store metadata relating to inputs to the application that specify an operation performed by the application; and
the framework is adapted to control the at least one application to store a mapping between the data and the report template in conjunction with the metadata.

6. The computer apparatus of claim 1, wherein the framework is further adapted to determine, upon start-up, that the framework application previously experienced an error condition after the computer-executable module was obtained and to disable operation of the computer-executable module.

7. Computer apparatus comprising:
a network interface; and
a computer-readable medium comprising:
at least one computer-executable component defining a virtual machine;
a plurality of computer-executable components executing on the virtual machine, the plurality of components comprising:
a framework for interacting through the network interface with a client and a plurality of first data sources, the framework adapted to perform first functions in response to input received from the client, the first functions comprising:
obtaining data from the plurality of first data sources;
performing a plurality of first data processing functions to produce first processed data;
preparing first formatted data from the first processed data, the first formatted data in a first format for display to a user; and
providing the first formatted data to the client;
a module for performing a second function, different than the first functions, in response to user input, the second function comprising at least one of:
obtaining data from a second data source different than the plurality of first data sources;
performing a second data processing function, different than the plurality of first data processing functions, to produce second processed data; or
preparing second formatted data from the first processed data or second processed data in a second format, different than the first format, for display to a user; and
a manifest specifying modules for performing a plurality of functions comprising the first functions and the second function;
wherein the framework, if an indication is received from the client that user input identifying the second function was received at the client, identifies the module for performing the second function from the manifest and provides the module for performing the second function to the client.

8. The computer apparatus of claim 7, wherein the module for performing the second function comprises a plug-in to the framework.

9. The computer apparatus of claim 8, wherein the first functions further comprise providing a client-side plug-in which, when executed, is adapted to interact with the plug-in.

10. The computer apparatus of claim 9, wherein the framework interacts with the client to determine whether the client comprises client software modules identified on the manifest; and when the client does not contain a client software module identified on the manifest, provides the client software module to the client.

11. The computer apparatus of claim 7, wherein the second function comprises obtaining data from the second data source and combining the data with data obtained from at least one of the plurality of first data sources to generate business intelligence.

12. The computer apparatus of claim 7, wherein the computer-readable medium further comprises computer-executable components implementing an application executing outside of the virtual machine.

* * * * *